(12) United States Patent
Kawasaki et al.

(10) Patent No.: US 8,307,319 B2
(45) Date of Patent: Nov. 6, 2012

(54) INTEGRATED CIRCUIT RELIABILITY

(75) Inventors: Hisao Kawasaki, Grenoble (FR); David Ney, Chambery (FR)

(73) Assignee: Freescale Semiconductor, Inc., Austin, TX (US)

( * ) Notice: Subject to any disclaimer, the term of this patent is extended or adjusted under 35 U.S.C. 154(b) by 422 days.

(21) Appl. No.: 12/599,152

(22) PCT Filed: May 15, 2007

(86) PCT No.: PCT/IB2007/052715
§ 371 (c)(1),
(2), (4) Date: Nov. 6, 2009

(87) PCT Pub. No.: WO2008/139277
PCT Pub. Date: Nov. 20, 2008

(65) Prior Publication Data
US 2010/0301487 A1    Dec. 2, 2010

(51) Int. Cl.
*G06F 17/50* (2006.01)
(52) U.S. Cl. .................. 716/122; 716/115; 716/132
(58) Field of Classification Search .................. None
See application file for complete search history.

(56) References Cited

U.S. PATENT DOCUMENTS

| | | | |
|---|---|---|---|
| 5,654,897 A | 8/1997 | Tripathi et al. | |
| 7,013,446 B2 * | 3/2006 | Ohba et al. | 716/122 |
| 7,538,433 B2 * | 5/2009 | Takemura et al. | 257/750 |
| 7,544,606 B2 * | 6/2009 | Wang et al. | 438/631 |
| 2004/0083438 A1 | 4/2004 | Ohba et al. | |
| 2006/0276030 A1 | 12/2006 | Wang et al. | |

OTHER PUBLICATIONS

Kahng et al., "Filling Algorithms and Analyses for Layout Density Control," IEEE Trans. on CAD of ICs & Systems, vol. 18, No. 4, Apr. 1999, pp. 445-462.*
Lienig et al., "Introduction to Electromigration-Aware Physical Design," ISPD'06, Apr. 9-12, 2006, ACM, pp. 39-46.*
Ney et al., "Stress-Induced Electromigration Backflow Effect in Copper Interconnects," IEEE Trans. on Device and Materials Reliability, vol. 6, No. 2, Jun. 2006, pp. 175-180.*
Ney et al., "Blech effect in dual damascene copper-low k interconnects," 2005 IIRW Final Report, IEEE, pp. 27-30.*
Thrasher et al., "Blech Effect in Single-Inlaid Cu Interconnects," 2001 IEEE, pp. 177-179.*
Yoon et al., "Characterization of Patterned Low-k Film Delamination during CMP for the 32nm-node Cu/Ultra Low-k (k=1.6-1.8) Integration," 2004 IEEE, pp. 239-241.*
Blech, "Copper electromigration in aluminum," Journal of Applied Physics, vol. 48, No. 2, Feb. 1977, pp. 473-477.*

(Continued)

*Primary Examiner* — Leigh Garbowski

(57) ABSTRACT

A method of manufacturing an integrated circuit having minimized electromigration effect, wherein the integrated circuit comprises one or more interconnect, said the or each interconnect comprising a dielectric layer having an intrinsic parameter at a first defined value, characterized in that said method comprises: identifying one or more characteristics of the or each interconnect; determining a minimal process distance from the or each interconnect for the application of one or more first metal elements; calculating a required correction parameter which can correct the intrinsic parameter at said first defined value; calculating a required number of the first metal elements which have the intrinsic parameter at a second defined value, such that the second defined value provides the required correction parameter for the first defined value; applying a plurality of said first metal elements around the interconnect at said minimum process distance to overcome the problem of electromigration caused by the intrinsic parameter at the first defined value.

17 Claims, 5 Drawing Sheets

OTHER PUBLICATIONS

Ney et al., "Determination of Irms rules for 65 nm node design foundations and thermal effect of dummies," IEEE 44$^{th}$ Annual Int'l Reliability Physics Symposium, San Jose, 2006, pp. 669-670.*

International Search Report and Written Opinion correlating to PCT/IB2007/052715 dated May 15, 2007.

* cited by examiner

INTEGRATED CIRCUIT RELIABILITY

FIELD OF THE INVENTION

This invention relates to improvements in or relating to integrated circuit reliability and particularly describes a new method and apparatus for integrated circuit layout to reduce electromigration degradations.

BACKGROUND OF THE INVENTION

In an integrated circuit, many different electronic devices or components such as transistors or capacitances are formed in or on a specific substrate which generally has a planar configuration. The electrical connections between these electronic devices located on a substrate occurs through a network of metal interconnects or interconnections. Nowadays, complex integrated circuits are formed with different metal layers or levels. The network of interconnects may include:

inner-level connections also called metal lines which make connections in the same layer;

inter-level connections called vias, which, are metal links which connect consecutive metals layers.

Metal lines and vias represent metallization layers also called interconnections or interconnects of an integrated circuit. Interconnections may be made of copper or aluminium or any other conducting material. Most recent integrated circuits use copper as the interconnection material as copper has a better electrical conductivity and a better electromigration resistance than aluminium.

Interconnects comprises a liner and a capping layer. For copper interconnects, the liner or the metal line of the interconnect is made of a tantalum material and surrounds the bottom and lateral surface of the interconnect in order to act as a copper diffusion barrier with the rest of the circuit. The capping layer is made of a silicon nitride material. The capping layer may also act as a diffusion barrier and a via etch stop layer. All interconnects are surrounded by dielectric materials to electrically insulate them from any other circuit.

Generally, recent integrated circuits use a dielectric layer which comprises a low-k dielectric. This low-k dielectric is a low permittivity material but moreover, it presents a low mechanical resistance.

As the number of electronic component on an integrated circuit continues to increase, the number of electrical interconnections is also growing significantly. The high number of electrical interconnections in a circuit and the reduction of device dimensions lead to many reliability issues. One of these reliability issues is electromigration concerns in a metal interconnect. When a current is flowing in the circuit, this current flow provides an electric potential in the interconnections. Due to this electrical potential, one portion of the interconnect structure becomes a cathode and the other portion becomes an anode.

As electrons always flow in an opposite direction from the direction of the current, electrons flow from the cathode to the anode. Such a movement of electrons generates movement of atoms of copper because electrons collide with atoms of copper in the copper interconnections. The atoms of copper tend to migrate in the same direction as the flow of electrons. Thus atoms of copper move to the anode side of the interconnection. Such an atoms movement is called electromigration flow. The liner edge of the liner above mentioned prevents atoms of copper reaching the dielectric layer and passing to the other metal levels through the vias. The cumulation of atoms of copper generates a compression state in the interconnect with respect to the dielectric environment at one side of the interconnect. This compression force applies to both the liner and the dielectric layer. Consequently, there is a mechanical stress gradient present along the interconnect. This stress gradient tends to create an opposite force in order to counter balance the electromigration flow: this is the well known Blech effect.

The opposite force tends to push back the atoms of copper to the cathode, against the electromigration force. This opposite force is linked to the mechanical resistance of the low k dielectric.

However the opposite force never compensates enough for the electromigration force. Thus electromigration phenomenon causes interconnect failure and consequently integrated circuits dysfunction which can lead to short circuits in the integrated circuit.

In certain prior art structure, one or more dummy copper cubes may be found interspersed over the layers in order to bring about a level of homogeneous density to the finished integrated circuit or device. The dummy cubes are randomly disposed, the aim of such an arrangement is to obtain an homogeneous density of all the elements on the integrated circuit or device.

SUMMARY OF THE INVENTION

An object of the present invention is to provide a method and an apparatus which overcome at least some of the problems associated with the prior art.

According to one aspect of the present invention there is provided a method and a system for integrated circuit layout as defined in the appended claims.

BRIEF DESCRIPTION OF THE DRAWINGS

Reference will now be made, by way of example, to the accompanying drawings, in which.

DETAILED DESCRIPTION OF THE PREFERRED EMBODIMENTS

Figure 1:
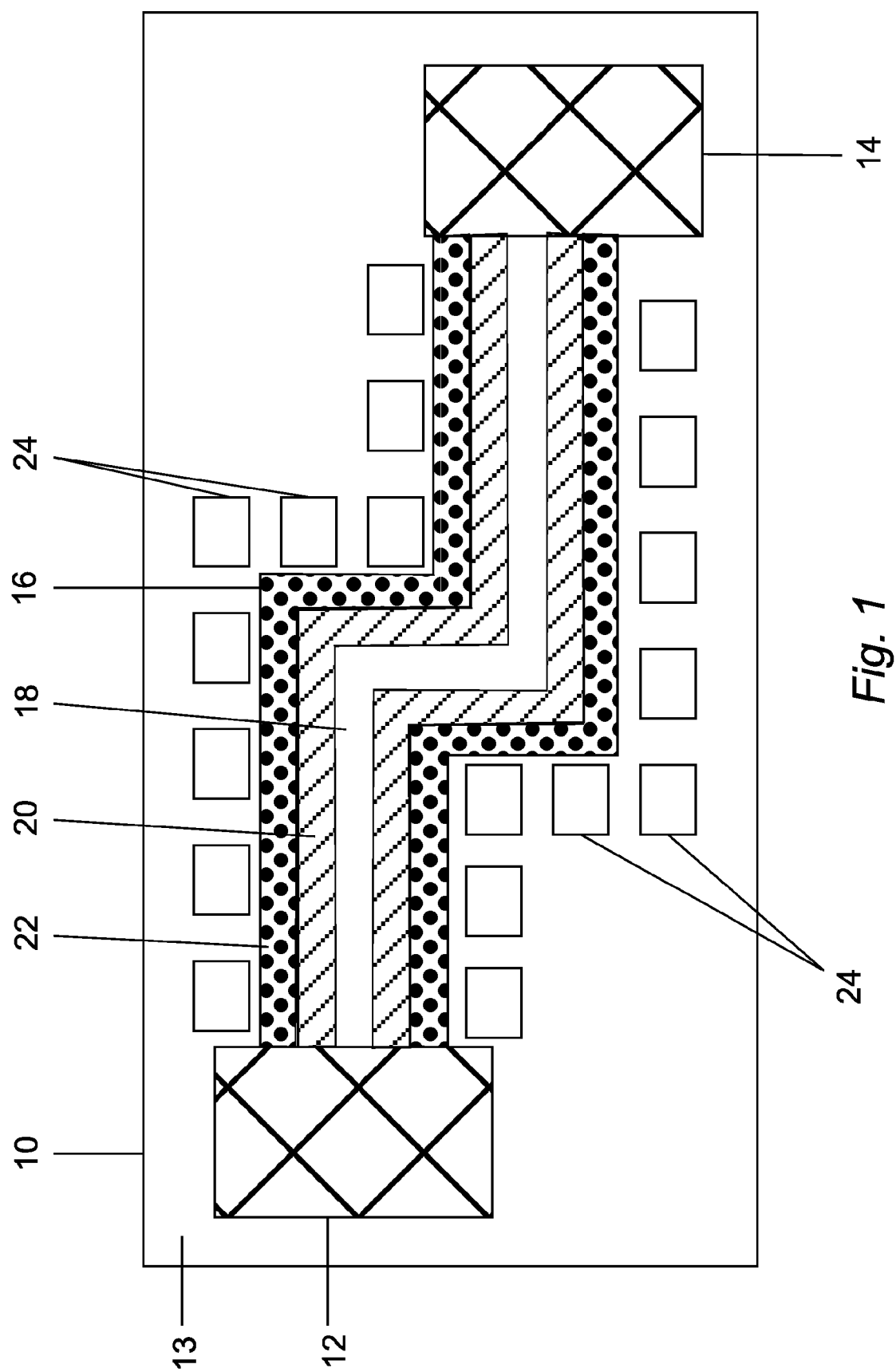
FIG. 1 shows an integrated circuit showing dummies surrounding an interconnect according to one embodiment of the present invention by way of example.

According to FIG. 1, an integrated circuit 10 comprises a substrate and different electronic components at different levels. The substrate is made of silicon. Each level represents a layer 13 of specific material with electronic components embedded thereon. The specific material is a dielectric which may be made of SiOC (Silicon Oxycarbide) or FSG (Fluorinated Silicate Glass) for instance. The electronic components can be for instance a transistor, a capacitance or any other kinds of elements. An interconnect 16 connects an electronic component or device 12 located in a layer to another electronic component or device 14 located in the same layer or in another layer located above or below the said layer. The interconnect 16 is generally made of a line of copper material 18 made through an etching process. A layer 20 which is a liner, surrounds all the upper surface of the copper line 18. This liner is generally made of tantalum material. This liner 20 acts as a barrier in order to prevent copper atoms going beyond the liner during the manufacturing process or during the occurrence of an electromigration effect, as will be described later. A layer 22 which is a dielectric layer, for instance made of SiO2, surrounds the surface of liner 20. The dielectric layer 22 relates to a specific dielectric as requested by the standards rules of the semi-conductor manufacturing process. This dielectric may belong to the category of the low-k dielectric material, which means that this dielectric has a low permittivity. The dielectric layer 22 is defined by a specific value 25 (not shown) of an intrinsic parameter 23 (not shown). The intrinsic parameter is the Young's modulus B which is linked to the related material. Thus the value 25 is linked to the material of the dielectric layer 22. Copper cubes 24 also called dummies are located all around the interconnect at a specific minimum distance from the interconnect as will be described later. These dummies 24 do not have any electrical properties which means that they are totally neutral. These dummies are defined by a specific value 27 (not shown) of the intrinsic parameter 23 or the Young's modulus. The role of the dummies is to change the value 25 of the Young's modulus of the interconnect in the area of the interconnect. This is achieved by locating the dummies 24 in specific calculated locations. This will be described in greater details below. The role of the dummies is also to give homogeneous density to the integrated circuit in known methods this is brought about by a random location on the integrated circuit. The dummies used to change the value 25 of the Young's modulus may not be the same as the dummies used to obtain homogeneous density. Therefore a third value 29 (not shown) of Young's modulus for the dummies used for the homogeneous density may differ from the value 27 of the Young's modulus used for the modification of the value 25 of the dielectric layer 22.

Figure 2:
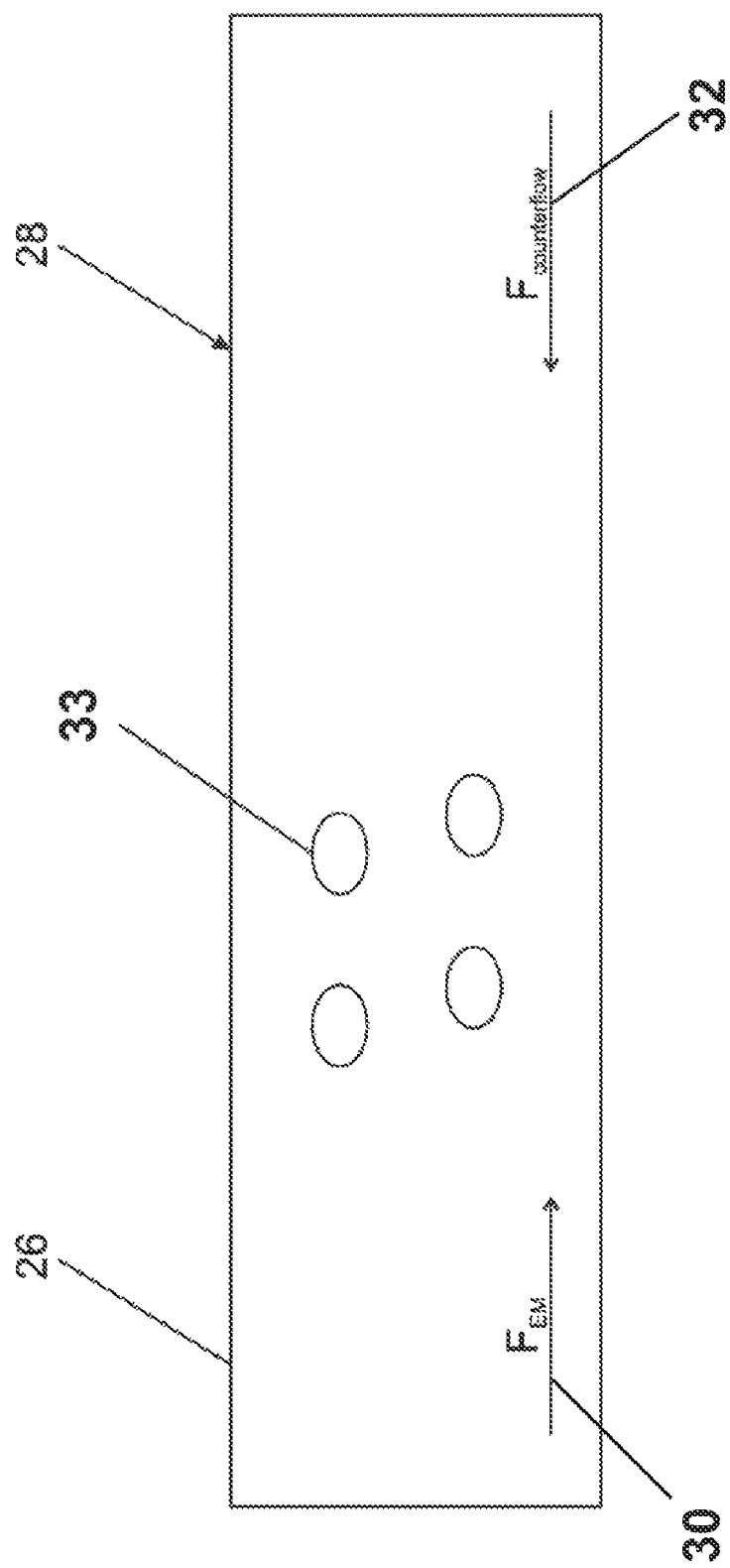
FIG. 2 shows a schematic drawing of forces occurring in an interconnect when electromigration occurs according to one embodiment of the present invention by way of example.

FIG. 2 describes details of the interconnect with different forces occurring in the interconnect 16 when a current is applied to the above described integrated circuit. In fact, as soon as a current flows in the integrated circuit and thus in the interconnect 16, the interconnect 16 becomes a polarized structure with a first side 26 acting as a cathode and a second side 28 acting as an anode. As a current flows in the interconnect 16, free electrons of the copper material of the interconnect 16 also flows in a direction opposite to the current direction. The electrons flow occurs from the cathode to the anode. This movement of electrons generates a movement of atoms of copper in the same direction, from the cathode 26 to the anode 28. Such a movement of atoms defines the electromigration effect. A force $F_{EM}$ 30 represents the electromigration force. This force represents the movement of the atoms 33 of copper. As many atoms of copper cumulate at the anode side of the interconnect 16, a reactive counter flow force $F_{counterflow}$ 32 occurs. This force 32 occurs through the Blech effect in reaction to the mechanical compression that a cumulative amount of atoms copper creates at the anode. A force 32 represents a counter flow force. Consequently, a resulting force $F_{net}$ is defined as indicated below.

$$F_{net} = F_{EM} + F_{counterflow} \quad (1)$$

The aim of the invention is to obtain a $F_{counterflow}$ force 32 which totally prevents any $F_{EM}$ force 30 to occur or which reduces significantly the value of the $F_{EM}$ force 30 to a negligible level. As indicated in the formula above, the aim of the invention is to obtain a resulting $F_{net}$ force 34 equal to or substantially equal to zero.

The net force can also be determined from drift velocity of the atoms (Vd) using the formula (2) which defines the speed of the atoms of the interconnect during the electromigration phenomenon:

$$v_d = \frac{D}{kT}\left(eZ^*\rho j - \Omega\frac{\Delta\sigma}{l}\right) \quad (2)$$

where:

$v_d$ represents the drift velocity of atoms of the interconnect during the electromigration phenomenon;

D represents the diffusivity of the copper;

eZ* represents the effective charge created by the movement of electrons;

ρj represent the electrical field created by the flow of electrons;

Ω represents the volume of atoms of copper;

Δσ represents the differential of mechanical constraints between cathode and anode and hence the mechanical properties of the dielectric;

l represents the length of the interconnect;

k represents the Boltzmann's constant;

T represents the temperature of the interconnect.

Drift velocity, $F_{EM}$ force 30 and $F_{counterflow}$ force 32 can also be defined by the following parameters:

$$v_d = \frac{D}{kT}(F_{EM} + F_{counterflow}) \quad (3)$$

$$\text{where } F_{EM} = eZ^*\rho j \text{ and } F_{counterflow} = -\Omega\frac{\Delta\sigma}{l} \quad (4)$$

As previously stated an object of the invention is to obtain $F_{counterflow}$ force 32 which totally or nearly compensates the $F_{EM}$ force 30 which also means that $V_d$ has to be equal to zero as indicated below, $$Vd = 0 \Rightarrow eZ^*\rho j - \Omega\frac{\Delta\sigma}{l} = 0 \quad (5)$$

This means there is no movement of copper atoms from this the following constraint can give rise to an absence of the electromigration effect:

$$eZ^*\rho j = \Omega\frac{\Delta\sigma}{l} \quad (6)$$

which is equivalent to $$(jl)^* = \frac{\Omega\Delta\sigma}{eZ\rho} \quad (7)$$

Where: (jl)* represents the mass flow of atoms of copper in the interconnect, generated by the electromigration effect;

$$\frac{\Omega \Delta \sigma}{eZ\rho}$$

represents the Blech product which defines the flow linked to the counterforce $F_{counterflow}$ force 32. The parameter $\Delta \sigma$ in the blech product represents as previously said the stress gradient along the metal line of the interconnect. $\Delta \sigma$ depends of the mechanical properties of the dielectric which surrounds the interconnect. Specific value of an effective young modulus B represents the mechanical properties of the dielectric which surrounds the interconnect. $\Delta \sigma$ can be defined with the following formula:

$$\Delta \sigma = -B\left(\frac{\Delta c}{c_0}\right) \quad (8)$$

where:
B represents the effective Young's modulus of the dielectric material,
$\Delta c$ represents the concentration of atoms of copper,
$c_0$ represents the concentration of atoms of copper when there is no current flow As previously mentioned, in order to avoid any $F_{EM}$ force 30, the Blech product $$\frac{\Omega \Delta \sigma}{eZ\rho}$$

has to be more important than (jl)*.

Accordingly, in order to obtain $$(jl)^* < \frac{\Omega \Delta \sigma}{eZ\rho},$$

two parameters can vary: either the length of the interconnect line has to be as short as possible, or $\Delta \sigma$ has to be as high as possible.

Figure 3:
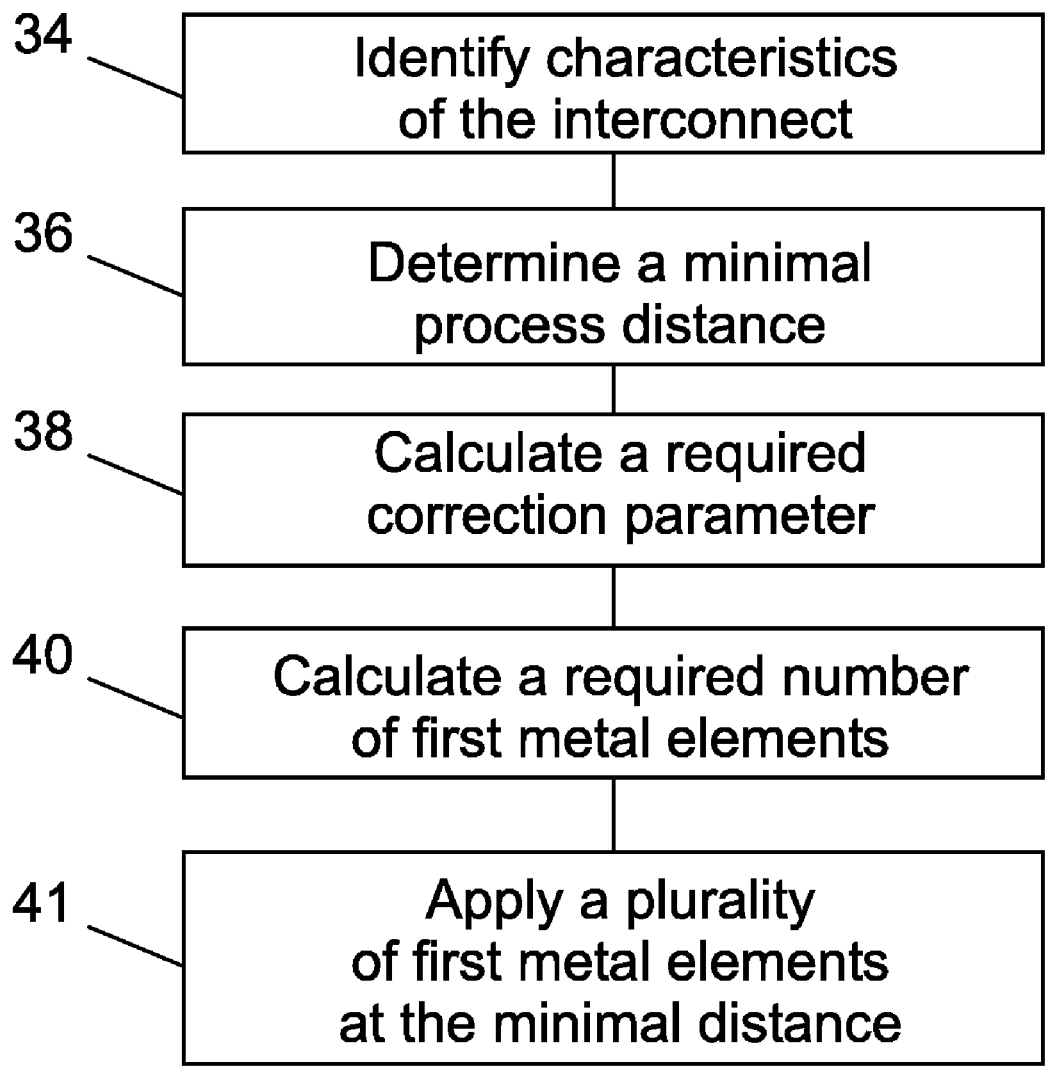
FIG. 3 shows a flow chart of the different steps of the method according to one embodiment of the present invention by way of example.

The reduction of the length of the interconnect can be obtained by modifying the whole interconnect line into short segments of line. Then all the segments have to be connected through vias between two levels of metal. Such a solution requires additional space in two levels of metal and is not ideal to manage. Consequently, the parameter $\Delta \sigma$ is a more efficient parameter to modify, to reduce or prevent the electromigration effect. Thus as previously stated, the value of $\Delta \sigma$ depends on the mechanical properties of the dielectric material which surrounds the interconnect in a predetermined manner. Therefore in order to increase the value $\Delta \sigma$ which represents the mechanical properties of the dielectric the value of B has to be increased. In order to increase B, the present invention discloses a method which applies specific cubes 24 of copper or dummies which are placed around the interconnect 16. These give rise to a change in the value of B in the area around the interconnect. Thus the new value of B represents both mechanical properties of the dielectric and mechanical properties of the dummies arranged around the interconnect. The dummies are located specifically around each interconnect without any density constraint. After the process of providing these dummies near the interconnect, another process occurs. In fact, as will be described later, in order to ensure an homogenous density of the integrated circuit, other dummies are arranged at different places on the integrated circuit in order to reach a level of density of the integrated circuit as required by standard rules of well known manufacturing process. These dummies 24 do not have any electrical property, and are totally neutral. In fact, a CAD (Computer Aided-Design) is used to apply dummies. The CAD tool may include different kinds of simulation and calculation tools. The process for applying dummies around one interconnect in accordance with the present invention occurs as shown in FIG. 3. In a first step 34, the CAD tool identifies one or more characteristics of the interconnect 16 in a layer 13. These characteristics comprises the length of the interconnect, the material of the interconnect, and the value 25 of the Young's modulus 23 of the dielectric layer of the interconnect for instance.

Then in a second step 36, the CAD tool determines a minimal distance 42 to realize the process of applying dummies. This distance is called minimal process distance. In fact, the CAD tool has to adapt the minimal process distance to the corresponding interconnect in order to put the dummies at this specific distance from the interconnect. This specific distance 42 depends on the process CAD tool ability and optimizations. In fact, interconnects are made of etched lines. The tool can only apply dummies at a minimum distance away from the boundary of the etched line of the interconnect because of the spatial resolution of the CAD tool.

Figure 4:
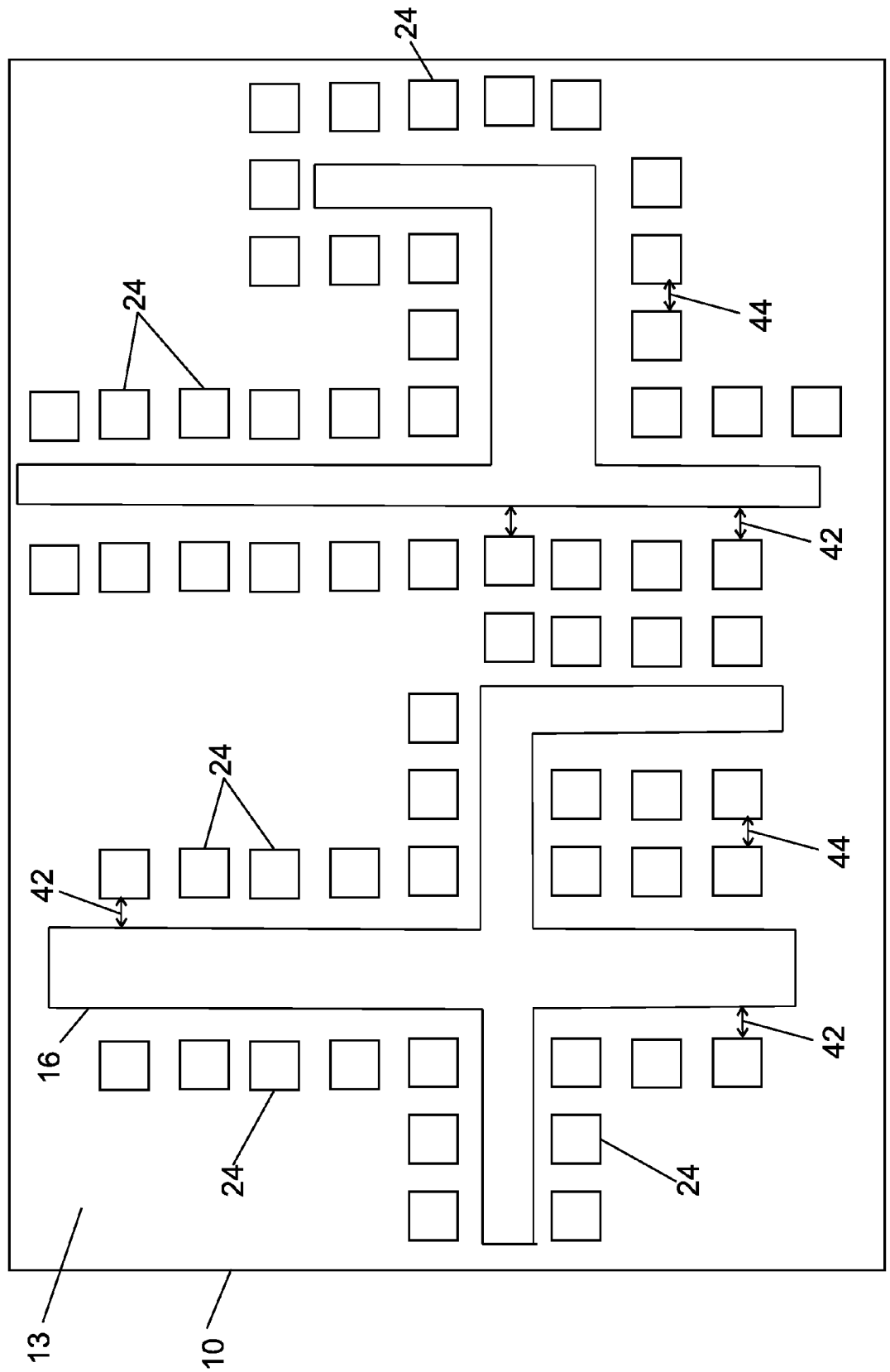
FIG. 4 shows a schematic drawing of dummies located at minimum spacing around interconnects according to one embodiment of the present invention by way of example.
Figure 5:
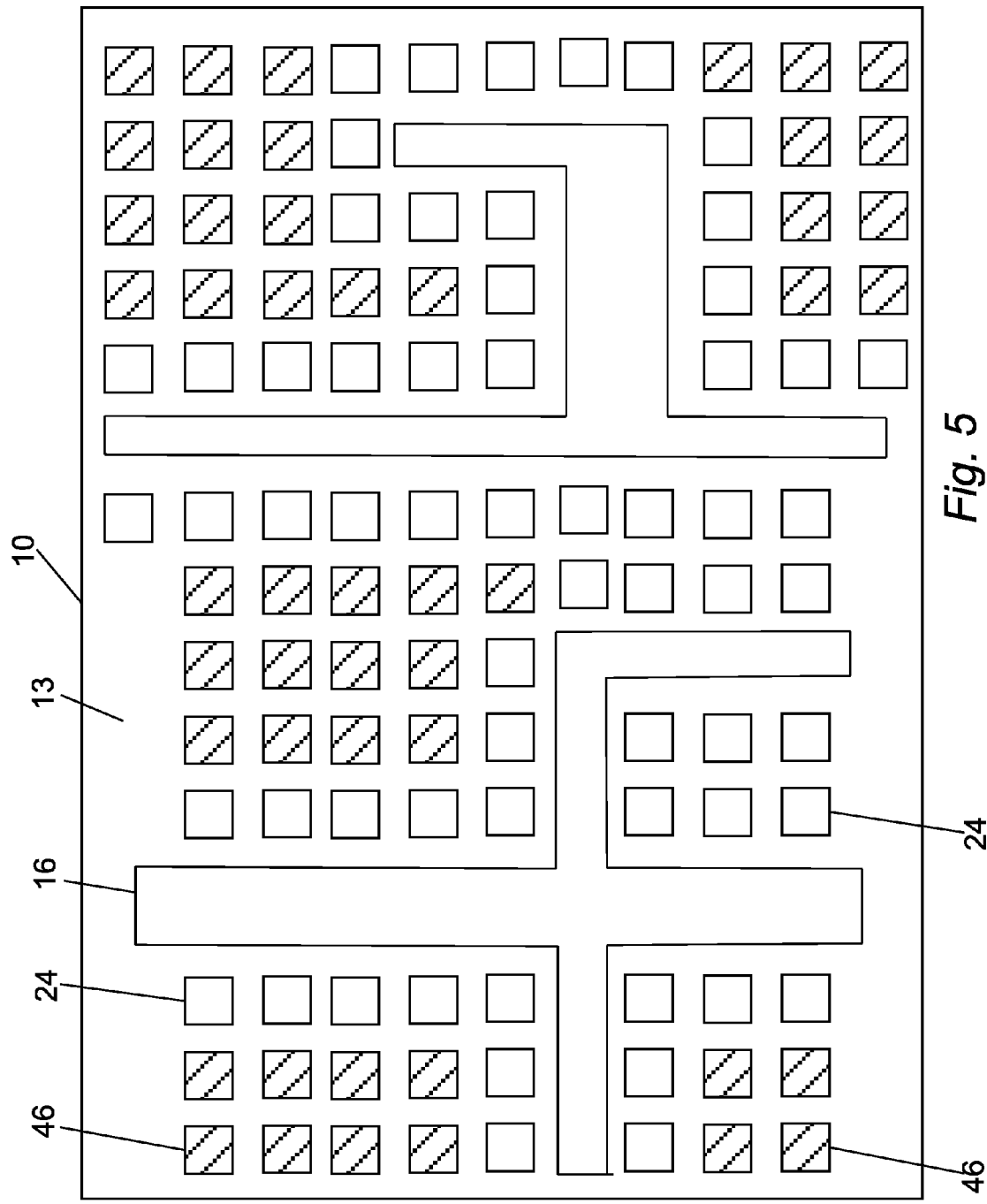
FIG. 5 shows a schematic drawing of other dummies located on the integrated circuit according to one embodiment of the present invention by way of example.

In a further step 38, the CAD tool calculates a required correction parameter in order to reduce or to avoid the electromigration effect. The calculation is based on the value of the intrinsic parameter 23 or Young's modulus and related to equations (7) and (8) above mentioned. The CAD tool determines a correction parameter for which electromigration is reduced or absent. Then in a further step 40, the CAD tool determines a corresponding number of first metal elements or dummies 24 which relate to the correction parameter. After that, in a further step 41, the CAD tool applies dummies 24 at the minimal distance determined in step 36. Thus the many dummies 24 are located as shown in FIG. 4. These dummies are located with a space 44 between them and with a minimum spacing 42 between them and the interconnect 16. In a further step, the CAD tool fills in the other parts of the integrated circuits, which means outside the interconnects and dummies 24, with further copper dummies 46. Such a fill-in is necessary in order to obtain an even surface density of the integrated circuit as known in prior art manufacturing process. Therefore the integrated circuit 10 has a structure as shown in FIG. 5 where dummies 24 surround interconnects 16. Also dummies 46 are located in the empty gaps between dummies 24 in order to equitably spread the dummies 46 on the layer 13. The present invention thus creates a strengthening of the dielectric layer 22 located around the interconnect because the modified value of the Young's modulus of the dielectric layer 22 is such that it allows a reduction or an avoidance of the electromigration effect. In fact the correction parameter which is required to reduce electromigration effect is an addition of the first defined value 25 and the second defined value 27. The correction parameter may be another combination of the first defined value and the second defined value. As the standard rules ITRS enforces the use of low-k dielectric, the present invention allows an increase of the dielectric effective modulus B without intrinsincally modifying the low-k dielectric. The A parameter is modified due to the change of the near environment of the dielectric layer 22 which surrounds the interconnect 16. Therefore the Blech product is increased and the counterflow Force has an increased value in order to compensate the electromigration effect.

Experimentations showed that the prior art layout such as leads to a value of 2800-3500 A/cm whereas the new layout method as presented in the invention leads to a value of 5000 A/cm.

It will be appreciated that the examples described above are just that. Other alternatives may exist which fall within the scope of the present invention.

The invention claimed is:

1. A method of manufacturing an integrated circuit having reduced electromigration effect, wherein the integrated circuit comprises one or more interconnects, each interconnect of said one or more interconnects comprising a dielectric layer made of a material having a Young's modulus at a first defined value linked to the material of the dielectric layer, characterized in that said method comprises:
    identifying one or more characteristics of said each interconnect;
    determining, at a computer, a minimum process distance from said each interconnect for the application of one or more first metal dummies;
    calculating, at the computer, a required correction parameter which can correct the Young's modulus at said first defined value linked to the material of the dielectric layer;
    calculating, at the computer, a required number of the first metal dummies which have a Young's modulus at a second defined value linked to the material of the dummies, such that the second defined value provides the required correction parameter for the first defined value linked to the material of the dielectric layer by using the Blech product; and
    determining, at the computer, where to apply a plurality of said first metal dummies around the interconnect at said minimum process distance to provide a corrected Young's modulus at a combined value of the first defined value and the second defined value.

2. The method as claimed in claim 1, wherein identifying characteristics of the interconnect comprises identifying characteristics in a list which includes the length, the material and the first defined value of the Young's modulus of the dielectric layer of said each interconnect.

3. The method as claimed in claim 2, wherein the method further comprises calculating, at the computer, a number of second metal dummies having a third defined value linked to the homogeneous density of the integrated circuit of Young's modulus in order to obtain an even metal density of said layer of the integrated circuit.

4. The method as claimed in claim 2, wherein the method further comprises determining at the computer where to provide a plurality of second metal dummies related to said each interconnect of the integrated circuit, outside the space defined by the plurality of first metal dummies.

5. The method of claim 4, wherein determining where to provide the plurality of second metal dummies comprises providing copper dummies.

6. The method of claim 2, wherein determining where to provide the plurality of first metal dummies comprises providing copper dummies.

7. The method as claimed in claim 1, wherein the method further comprises calculating, at the computer, a number of second metal dummies having a third defined value linked to the homogeneous density of the integrated circuit of Young's modulus in order to obtain an even metal density of said layer of the integrated circuit.

8. The method as claimed in claim 7, wherein the method further comprises determining, at the computer, where to provide a plurality of second metal dummies related to said each interconnect of the integrated circuit, outside the space defined by the plurality of first metal dummies.

9. The method of claim 8, wherein determining where to provide the plurality of second metal dummies comprises providing copper dummies.

10. The method of claim 7, wherein determining where to provide the plurality of first metal dummies comprises providing copper dummies.

11. The method as claimed in claim 1, wherein the method further comprises determining, at the computer, at the location where to provide a plurality of second metal dummies related to said each interconnect of the integrated circuit, outside the space defined by the plurality of first metal dummies.

12. The method of claim 11, wherein the plurality of second metal dummies comprise copper.

13. The method of claim 11, wherein determining where to provide the plurality of first metal dummies comprises providing copper dummies.

14. The method of claim 1, wherein providing the plurality of first metal dummies comprises providing copper dummies.

15. An integrated circuit comprising:
    one or more interconnects, each interconnect of said one or more interconnects comprising a dielectric layer having a Young's modulus at a first defined value linked to the material of the dielectric layer wherein first metal dummies are located at a minimal process distance from an interconnect of said one or more interconnects, said first metal dummies having a second defined value linked to the material of the dummies which provides a required correction parameter for the first defined value in order to overcome an electromigration effect caused by the Young's modulus at the first defined value.

16. The integrated circuit of claim 15 wherein second metal dummies having a third defined value are located outside the space defined by the plurality of first metal dummies.

17. A computer-readable storage medium having a computer-executable program comprising instructions, that when executed by a computer carry out the method comprising:
    for an integrated circuit comprising one or more interconnects, each interconnect of said one or more interconnects comprising a dielectric layer made of a material having a Young's modulus at a first defined value linked to the material of the dielectric layer identifying one or more characteristics of said each interconnect;
    determining a minimum process distance from said each interconnect for the application of one or more first metal dummies;
    calculating a required correction parameter which can correct the Young's modulus 23 at said first defined value linked to the material of the dielectric layer;
    calculating a required number of the first metal dummies which have a Young's modulus at a second defined value linked to the material of the dummies, such that the second defined value provides the required correction parameter for the first defined value linked to the material of the dielectric layer by using the Blech product;
    applying a plurality of said first metal dummies around said each interconnect at said minimum process distance to provide a corrected Young's modulus at a combined value of the first defined value and the second defined value.

* * * * *

UNITED STATES PATENT AND TRADEMARK OFFICE
CERTIFICATE OF CORRECTION

PATENT NO. : 8,307,319 B2  
APPLICATION NO. : 12/599152  
DATED : November 6, 2012  
INVENTOR(S) : Hisao Kawasaki and David Ney Page 1 of 1

It is certified that error appears in the above-identified patent and that said Letters Patent is hereby corrected as shown below:

On the Title Page

Item (54) and in the Specification, Column 1, line 1, please change
"INTEGRATED CIRCUIT RELIABILITY" to be -- IMPROVEMENTS IN OR RELATING TO INTEGRATED CIRCUIT RELIABILITY--

Item (73), please change "Freescale Semiconductor, Inc., Austin, TX (US)" to be
--Freescale Semiconductor, Inc., Austin, TX (US); ST Microelectronics (Crolles 2) SAS, Crolles (FR)--

Signed and Sealed this
Twenty-fourth Day of February, 2015

Michelle K. Lee
*Deputy Director of the United States Patent and Trademark Office*